(12) United States Patent
Kelly et al.

(10) Patent No.: US 9,014,442 B2
(45) Date of Patent: Apr. 21, 2015

(54) METHODS AND APPARATUS FOR IDENTIFYING A REGION OF INTEREST IN A MEDICAL IMAGE

(75) Inventors: Matthew David Kelly, Botley Oxfordshire (GB); Kinda Anna Saddi, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 630 days.

(21) Appl. No.: 13/304,857

(22) Filed: Nov. 28, 2011

(65) Prior Publication Data

US 2012/0134557 A1  May 31, 2012

(30) Foreign Application Priority Data

Nov. 26, 2010  (GB) .................................... 1020074.9

(51) Int. Cl.
*G06K 9/00* (2006.01)
*G06T 7/00* (2006.01)

(52) U.S. Cl.
CPC ..... *G06T 7/0081* (2013.01); *G06T 2207/10104* (2013.01); *G06T 2207/10108* (2013.01); *G06T 2207/20104* (2013.01); *G06T 2207/30096* (2013.01)

(58) Field of Classification Search
CPC ............. G01R 33/4808; G01R 33/481; G01T 1/2985; G06T 7/0097; G06T 2207/10104; A61B 6/037; A61N 2005/1052
See application file for complete search history.

(56) References Cited

U.S. PATENT DOCUMENTS

| | | | |
|---|---|---|---|
| 8,498,492 B2 * | 7/2013 | Declerck et al. .............. | 382/226 |
| 2007/0081712 A1 * | 4/2007 | Huang et al. .................. | 382/128 |
| 2007/0103464 A1 | 5/2007 | Kaufman et al. | |
| 2009/0097749 A1 | 4/2009 | Busch | |
| 2009/0279755 A1 * | 11/2009 | Gindele et al. ................ | 382/128 |
| 2010/0088644 A1 | 4/2010 | Dowson et al. | |

FOREIGN PATENT DOCUMENTS

| | | |
|---|---|---|
| GB | 2 468 589 A | 9/2010 |
| GB | 2468589 A | 9/2010 |
| GB | 2472313 A | 2/2011 |

* cited by examiner

*Primary Examiner* — Stephen R Koziol
*Assistant Examiner* — Timothy Choi
(74) *Attorney, Agent, or Firm* — Schiff Hardin LLP

(57) ABSTRACT

In a method or apparatus for identifying a region of interest in a medical image of a subject, at least one local maximum region of the image is determined for which a value of a given variable is a local maximum value. A user-selection of an initial voxel in the image is registered. As the region of interest, a connected set of voxels for which values of the given variable are greater than a threshold is selected, the selected set of voxels comprising a first local maximum region at a distance from the user-selected voxel, and the threshold being a given fraction of the local maximum value of the first local maximum region in the set.

16 Claims, 5 Drawing Sheets

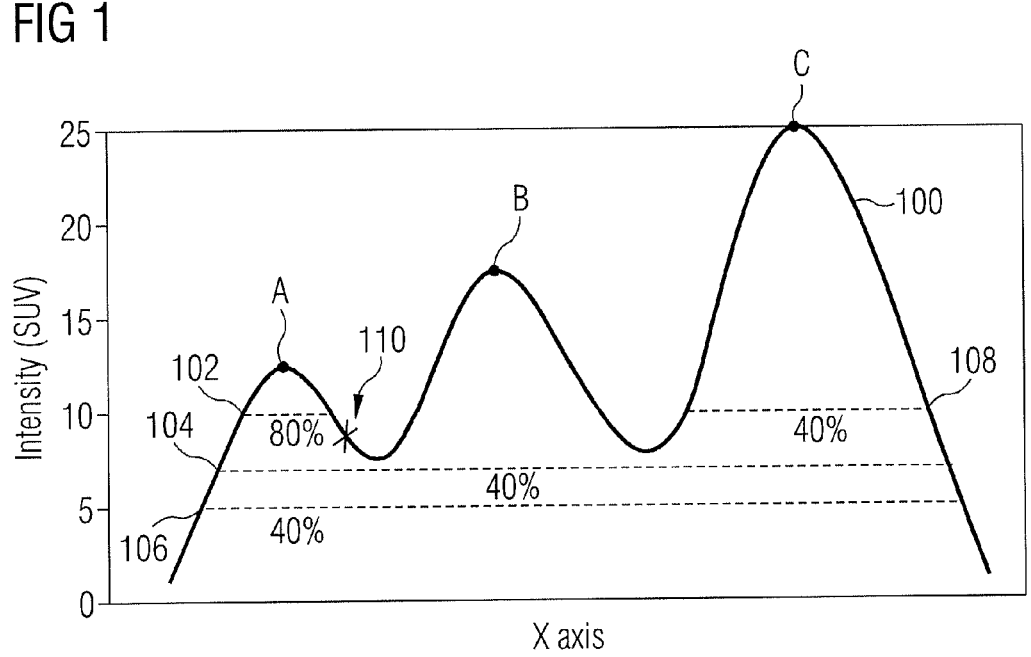

METHODS AND APPARATUS FOR IDENTIFYING A REGION OF INTEREST IN A MEDICAL IMAGE

BACKGROUND

This disclosure is directed to methods and apparatus for identifying a region of interest in a medical image.

The definition of regions or volumes of interest (ROI/VOI) is a typical precursor to quantitative analysis of medical images, such as nuclear medicine emission images (for example, PET or SPECT). Such regions may be defined around areas of high intensity which correspond to high tracer uptake (hotspots). For example, in FDG-PET images for oncology, such areas may be indicative of the presence of a tumor. Oncology physicians frequently annotate lesions in PET scans for the purpose of making a diagnosis, or for use in radiotherapy. The mean or maximum tracer uptake can aid a reader in determining the likelihood of cancer. In longitudinal studies, considering the change in intensity or uptake on corresponding VOIs from images at different temporal stages may be used to determine whether a tumor has regressed.

The ROI/VOI delineation step is generally a user interactive process. In PET, it is common to define such regions using a manually adjusted threshold either defined on an absolute scale or with reference to a local maximum in intensity, or some other reference region.

In most applications, this is typically achieved by selecting a region and a threshold that delineates the lesion. One issue in such threshold based segmentations is the determination of the threshold. It should be determined such that the object of interest is included in the VOI but such that the background is not. In some cases this determination is made difficult by the presence of other high uptake structures or features of the image adjacent to the region of interest. For example a lung tumor may be close to the heart left ventricle, a site of typical high uptake in FDG-PET. Alternatively, there may be several tumors in close proximity to one another and the user may wish to delineate each separately.

The difficulty is more pronounced in 3D than in 2D since the user must check each slice over which the VOI is defined, since connectivity between voxels included in the object of interest may be present across voxels not in the current displayed slices. This can be slow and laborious.

More advanced delineation methods exist. One of them is the Incremental Connected Components (ICC) method described in the applicant's co-pending UK patent application no. 0914637.4 corresponding to US published application 2010/0088644, incorporated herein by reference. This method defines a set of regions associated with local maxima in an image. Its output is a description of the topology of these local maxima and allows rapid selection of hotspots (hereafter called Regions of Interest (ROIs)) near a click point given a threshold. The ICC algorithm aims to guarantee the selection of an ROI that contains only one connected component, a fundamental characteristic of the algorithm.

However, even such methods can produce erroneous or unsuitable ROIs, usually depending on the threshold selected by the algorithm, or by the user.

SUMMARY

It is an object to address these problems and provide improvements upon known devices and methods.

In a method or apparatus for identifying a region of interest in a medical image of a subject, at least one local maximum region of the image is determined for which a value of a given variable is a local maximum value. A user-selection of an initial voxel in the image is registered. As the region of interest, a connected set of voxels for which values of the given variable are greater than a threshold is selected, the selected set of voxels comprising a first local maximum region at a distance from the user-selected voxel, and the threshold being a given fraction of the local maximum value of the first local maximum region in the set.

BRIEF DESCRIPTION OF THE DRAWINGS

FIG. 1 is a diagram illustrating image region intensities relating to an exemplary embodiment of the invention;

DESCRIPTION OF THE PREFERRED EMBODIMENTS

Figure 2A:
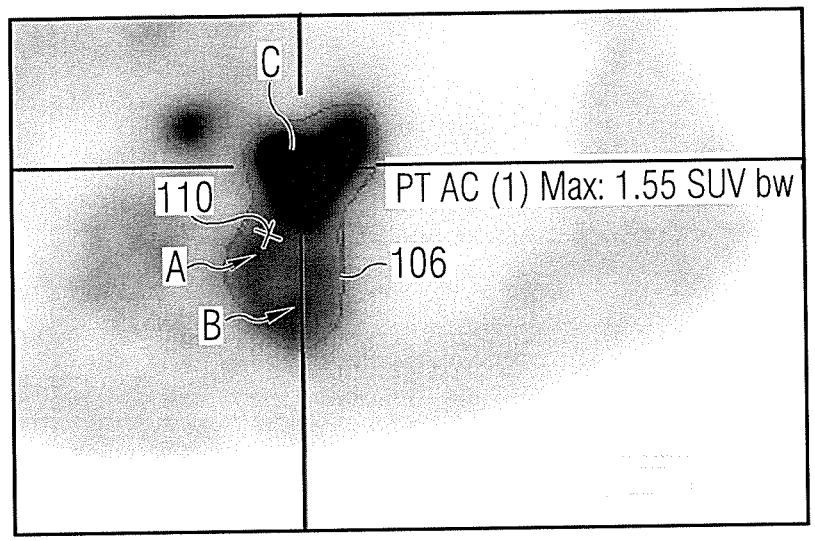
FIG. 2 is a diagram illustrating delineation of regions of interest according to an exemplary embodiment of the invention.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included.

In general terms, one exemplary embodiment of a first aspect can provide a method of identifying a region of interest in a medical image of a subject, comprising: determining at least one local maximum region of the image for which a value of a given variable is a local maximum value; registering a user-selection of an initial voxel in the image; and selecting, as a region of interest, a connected set of voxels for which values of the given variable are greater than a threshold, wherein the selected set of voxels comprises a first local maximum region at a distance from the user-selected voxel, and wherein the threshold is a given fraction of the local maximum value of the first local maximum region in the set.

This provides a way of selecting an ROI which is locally relevant to the selection made by the user.

Suitably, in the connected set of voxels each voxel of the set is adjacent to another voxel of the set, and any pair of voxels of the set is connected by a path of adjacent voxels of the group or region.

Preferably, in a further iteration of the method, the given fraction is altered.

In one exemplary embodiment, if in the initial iteration said distance between the user-selected voxel and the selected local maximum region is greater than a tolerated distance, the given fraction is altered to increase the threshold until the first local maximum region is no longer included in the connected set.

Preferably, the threshold is increased until the selected local maximum region is a second local maximum region at less than a tolerated distance from the user-selected voxel.

These exemplary embodiments allow the method to return a locally relevant ROI, where an initial stage has given a less satisfactory, or less locally relevant, result.

In another exemplary embodiment, the given fraction is altered by a user selection interaction.

Preferably, the user selection interaction comprises, following user selection of the initial voxel, a further user selection of at least another voxel.

Suitably, the further selected voxel is closer to a second local maximum region than the initial voxel, and wherein the difference in the variable between the initial and further selected voxels is used to calculate the alteration in the given fraction.

In an exemplary embodiment, the further user selection comprises selection of a connected set of voxels in a line across the image. Suitably, the initial voxel is selected by a single contact on a user interface device; and the line is selected by a continuous contact on the user interface device, while a cursor crosses a display showing the image, along the selection line.

In another embodiment, the user selection interaction comprises user selection of a connected set of voxels in a line across the image, and the initial voxel is set as the midpoint voxel of the line, and the difference in the variable between the midpoint voxel and an end of the line having a lower value for the variable than the other end, is used to calculate the alteration in the given fraction.

Preferably, the method of an exemplary embodiment further comprises: pre-processing the image to generate a list of voxels of the image sorted according to the given variable; and following generation of the list, registering the user selection of the initial voxel.

Suitably, the list of voxels is generated by a connected-component algorithm.

Preferably, for each of a plurality of identifications of a region of interest in the image, the given fraction is initially set at a default fraction. More preferably, the default fraction is 40%.

In exemplary embodiments: the local maximum region of the image, for which a value of a given variable is a local maximum value, is a single voxel; the given variable is intensity; and the intensity is measured as SUV.

In general terms, one embodiment of a second aspect of the invention can provide apparatus for identifying a region of interest in a medical image of a subject, comprising: a processor configured to: determine at least one local maximum region of the image for which a value of a given variable is a local maximum value; register a user-selection of an initial voxel in the image; and select, as a region of interest, a connected set of voxels for which values of the given variable are greater than a threshold, wherein the selected set of voxels comprises a first local maximum region at a distance from the user-selected voxel, and wherein the threshold is a given fraction of the local maximum value of the first local maximum region in the set; and a display device configured to display the image and the selected region of interest.

Further aspects of exemplary embodiments comprise computer programs which, when loaded into or run on a computer, cause the computer to become apparatus, or to carry out methods, according to the aspects described above.

The above aspects and embodiments may be combined to provide further aspects and embodiments.

Exemplary embodiments will now be described by way of example with reference to the accompanying drawings; and when the following terms are used herein, the accompanying definitions can be applied:

ICC Incremental Connected Component
PET Positron Emission Tomography
ROI Region of Interest
SUV Standard Uptake Value
Hotspot Region associated with a local maximum intensity
Threshold a particular value (of e.g. SUV) within an image, often above or below which all pixels or voxels are accepted for a process or algorithm.
CT Computed Tomography Exemplary embodiments improve the (user-) interaction for ROI delineation in PET images, by default returning an ROI with a threshold value that is relative to the local maximum SUV of the PET image (i.e. 40% of SUVmax); or alternatively, returning an ROI with an automatically computed threshold that will guarantee a delineated ROI, if the initial threshold is not appropriate.

Other exemplary embodiments use increments to return regions so that user-interactions are smoother. The increments can be user-specified.

Typically in lesion delineation, the threshold might be: 1) fixed (e.g. 2.5 SUV), or 2) variable, i.e., pre-computed locally, (e.g. 40% of the highest uptake in the hotspot, hereafter called SUVmax).

The Incremental Connected Components (ICC) algorithms of UK patent application no. 0914637.4 define a set of regions associated with local maxima in an image. Using their output can give a description of the topology of these local maxima and they can allow rapid selection of hotspots/ROIs near a click point given a fixed threshold (e.g. 2.5 SUV) or variable threshold (one that depends on some feature of the local image, such as the local maximum in the image, e.g. 40% of SUVmax).

Briefly, the ICC algorithms work as follows. The list of regions and associated local maxima is obtained by pre-processing the image. This pre-processing is done using an iterative connected component (ICC) algorithm. An algorithm on which this ICC algorithm is in part based was introduced by Matas (Matas et al, *Robust Wide Baseline Stereo from Maximally Stable Extremal Regions*, Proc. Of British Machine Vision Conference, 2002). Variants have been implemented by Hong (Hong et al, *Combining Topological and Geometric Features of Mammograms to Detect Masses*, Proc. Of Medical Image Understanding and Analysis, London, September 2004.) amongst others.

The pre-processing operates by sorting the intensities in the image into descending order. The sorted list of intensities is traversed; the first voxel is labelled as the first local maximum, and the second, if not a neighbor of the first voxel, is labelled as a second local maximum. Thus those locations that currently have no neighbors form new labels (each label is associated with one local maximum) and those adjacent to labelled voxels take the (adjacent) label with the highest maximum.

Merges are recorded; if a voxel is connected by neighbors to both (for example) the first and second maxima, it is labelled as such. The output of the algorithm is: a label image, an intensity sorted list of voxels and a list of merges and a list of starting points.

When using a fixed threshold with such images there is usually no ambiguity in the selection of the ROI. However, when using a variable threshold there might be an ambiguity with which ROI to choose in cases where there are several hotspots near each other. This ambiguity is illustrated in FIG. 1 on a 1D example. The line 100 is a plot of intensity across part of an image (X axis). This part of the image contains three maxima, A, B and C indicated at the three peaks of the intensity plot.

A user click point is indicated at point 110. This is close to the maximum A, so the user is likely expecting the algorithm to delineate the hotspot around A, although this hotspot is lower in intensity than the hotspots at B and C.

A default variable threshold at 40% of the local maximum A does not "exist" in the sense that the point A is no longer the maximum inside the region given by thresholding at 40% of this local maximum (dotted line 106), as this threshold will include all three maxima. Since the largest region for maximum A merges with that of B, the 40% of local maximum of B is then checked, but this also does not exist as indicated by the second dashed line 104, as this threshold includes all three maxima too. Finally both maxima A and B merge with C and hence the 40% relative to maximum C is checked.

The local maximum now is maximum C, and 40% of this maximum does return a delineation of a single maximum (line 108), but unfortunately, it is a delineation of the hotspot around C, excluding A and B.

Figure 2B:
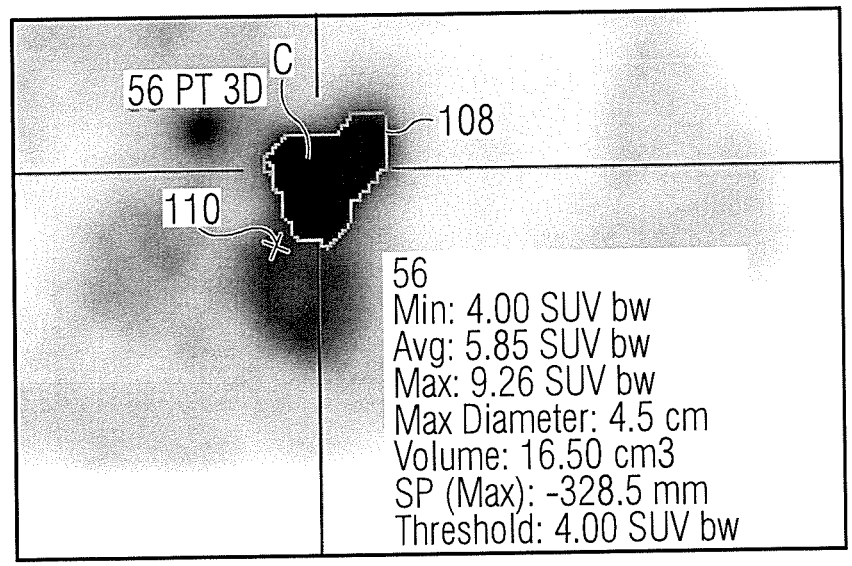

This is illustrated alternatively in the image examples FIGS. 2a and 2b. The click point 110 is near maximum A, but the default 40% of local maximum would return the dashed line 106 including all three maxima. Instead, the algorithm ends up returning the region 108 around the hotspot C.

However, if the threshold for local maximum A were to be set at 80% of the local maximum, this delineation does exist, and is shown in as the solid line 102. Therefore in this case, if the fraction of the local maximum used is changed from the default 40% to 80%, the local maximum A that the user is actually interested in, given that the click point 110 is near A, is returned. Therefore the ROI is the locally relevant ROI, rather than simply the default ROI returned by the algorithm.

One exemplary embodiment can solve the ambiguity above. When there is no region returned by the algorithm near the click point at the default variable threshold (e.g., 40% SUVmax), the algorithm increments the threshold in steps of 10% until the algorithm returns an ROI associated with the closest local maximum. This guarantees that the user will always be able to delineate a region near the click point.

The stipulation of how close/near the relevant local maximum should be to be a valid return to the user can be specified by default, or set by the user. For example, the user might set the tolerated distance to be 2, 5 or 10 mm—if the initial algorithm at the default 40% of local max returns a region further than this from the click point, a further iteration is made, at 50% of local max. If the search of the hierarchy/labels again returns a region further than this, further iterations are made until the local maximum returned is within the specified distance.

Figure 3A:
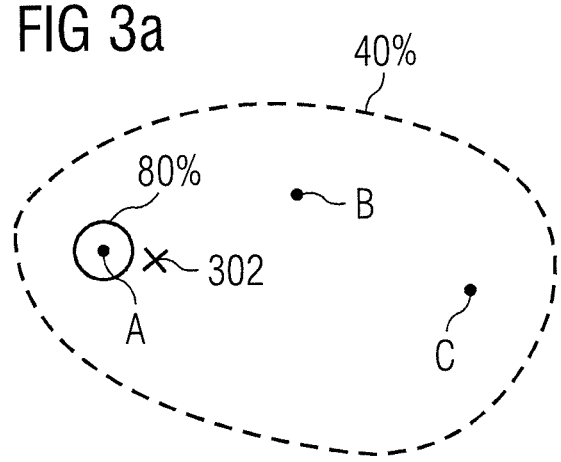
FIG. 3 is a diagram illustrating methods of user interaction according to exemplary embodiments of the invention.

An example of a successful delineation is shown in FIG. 3a. The click point 302 is near the maximum A. Again, the default 40% contour fails, including all three maxima A, B, C, but the 80% threshold gives a region localizing the hotspot A.

Exemplary embodiments of the invention can be implemented in a number of ways. Three modes of operation are described below.

1. "One Click": As described immediately above, a default region is returned when the user presses the left mouse button on the hotspot of interest, and if no region is returned (or no useful/valid region), the fraction of local maximum is increased incrementally (FIGS. 1, 3a).

Figure 3B:
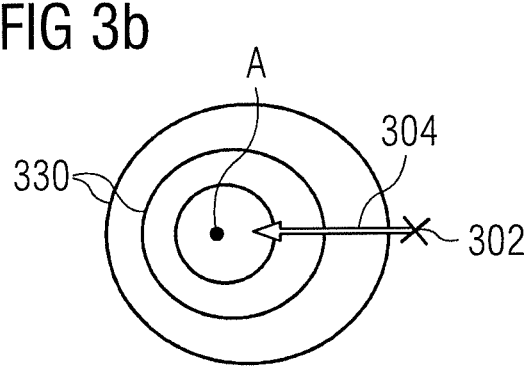

2. "Click and Drag": A different region is returned when the user drags the cursor, for example via a mouse while keeping the left button pressed. FIG. 3b shows the maximum A, a click point 302, and an indication of a mouse/cursor dragged path 304 towards the hotspot A. Lines 330 are isocontours through voxels having the same intensity values (for ease of indication of the varying intensities in the image, but also indicating potential step points for the increments—see below).

The new region depends on the intensity of the image at the current cursor location during/after dragging. In an embodiment of the invention, the selected intensity is then snapped to a closest threshold increment depending on the method of choice (the increment prevents computational waste on calculating a continuous variation in threshold in real time). Note that the "One Click" method can serve as a first initialisation for the first Click of the "Click and Drag".

For example, if the fraction began at default at 40% at the click point 302, the user can see in incremented real time the ROIs that will be returned as the click point is dragged closer to the hotspot A. As each increment is obtained, the threshold will be increased to a higher fraction (or to a higher absolute value, in the case of a fixed threshold, for example the value of intensity at the drag point). The incremented threshold can for example be chosen on the basis of a set of regions already identified in the ICC pre-processing, or on a difference/ratio of the intensity of the drag point from/to that of the initial click point.

Figure 3C:
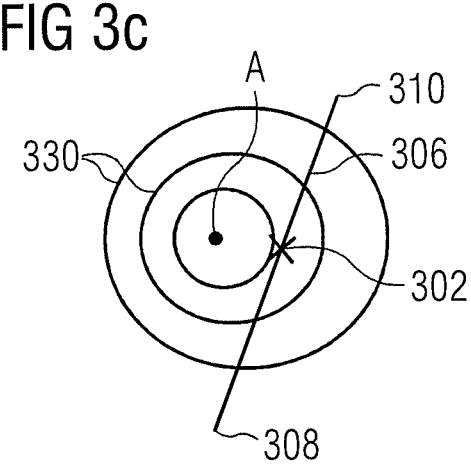

3. "Stroke line": Here (see FIG. 3c), the user indicates the start point of a stroke 308 (for example, by a mouse click) and the end point 310 (for example, by releasing the mouse button). One method chooses the minimum intensity of the start and end stroke points. Here, the midpoint of the stroke 306 acts as the "Click Point" 302. An interactive logic following the same idea as in "Click and Drag" could be used, as the end point will specify the intensity of the image at the current cursor location. The difference between the start/end (minimum) point and the "click point" can give the fraction to be used, or the fixed threshold to be used.

For illustrative purposes, refer to Table 1 below for the default values and threshold increments.

| | Interactive Method | | |
|---|---|---|---|
| Threshold | Example default threshold for "One Click" and first click of "Click and Drag" | Example of default increment for "Click and Drag" | Example of default increment for "Stroke Line" |
| Fixed Threshold | 2.5 SUV. | Increment of 0.5 SUV. | Increment of 0.5 SUV of minimum Intensity between start and end points. |
| Variable Threshold | 40% of $SUV_{max}$ or above such as an ROI is guaranteed to be delineated. | Increment of 10% of $SUV_{max}$. | Increment of 10% of $SUV_{max}$ of minimum Intensity between start and end points. |

Figure 4:
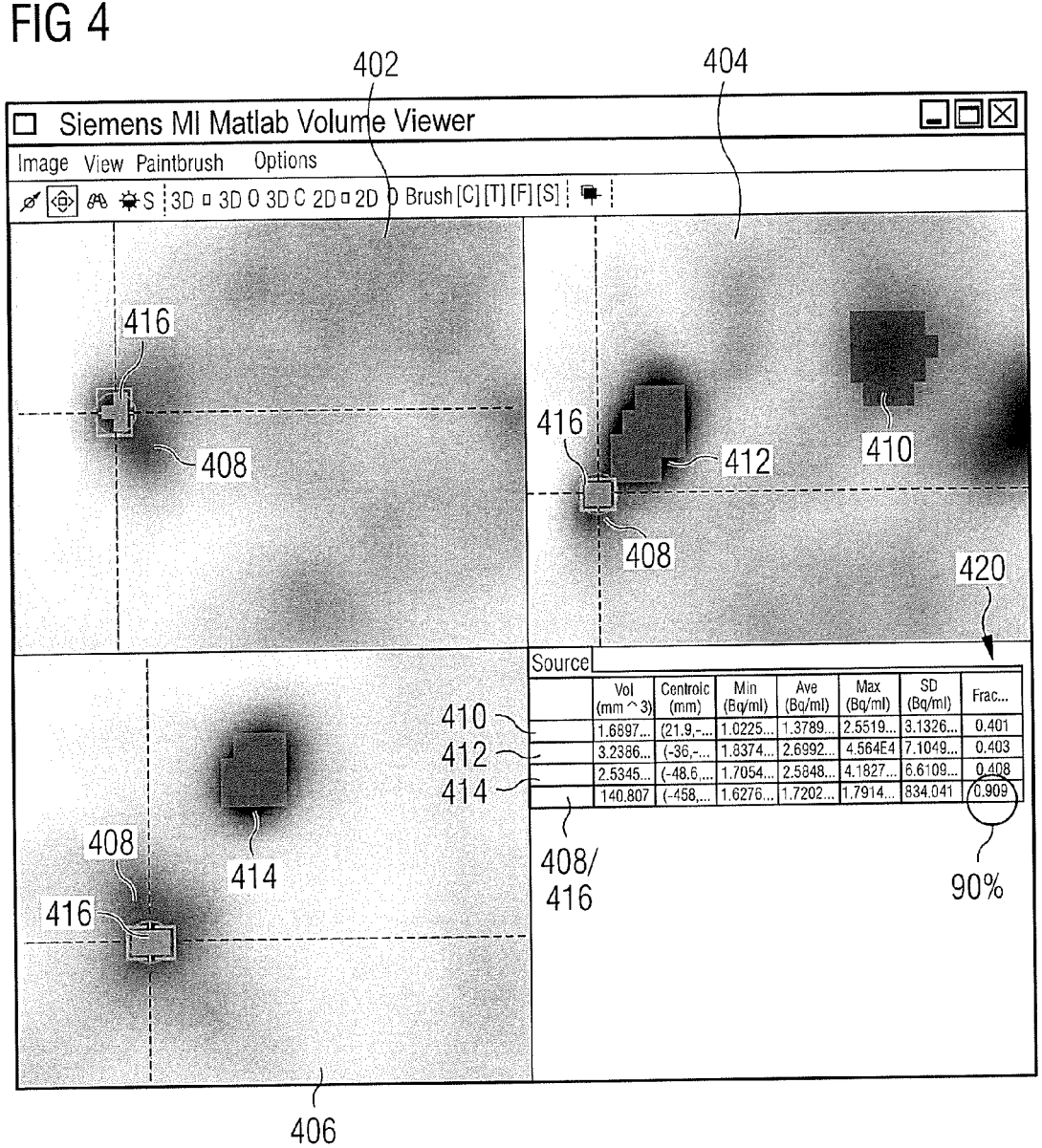
FIG. 4 is a diagram illustrating an example of an implementation of the method according to an exemplary embodiment of the invention.

A clinical example is shown in FIG. 4, which shows sagittal, coronal and axial images of an image volume in a subject (402, 404, 406). In this image volume, several suspected lesions 408, 410, 412 and 414 are visible. As can be seen from the second view (404), the user's indicated hotspot (408) can easily be confused with a neighboring hotspot 412.

Most of these hotspots are delineated at 40% of SUVmax (see the table 420, final column). However, it is impossible to delineate the hotspot 408 with the default variable threshold. In this case, a threshold at 90% of SUVmax is found incrementally (see final column, final row of table 420) and returns the region 416, correctly placed in the desired hotspot 408.

Exemplary embodiments are able to delineate hotspots that might be important for the user, which would not otherwise be possible to delineate only with the default variable threshold.

Figure 5:
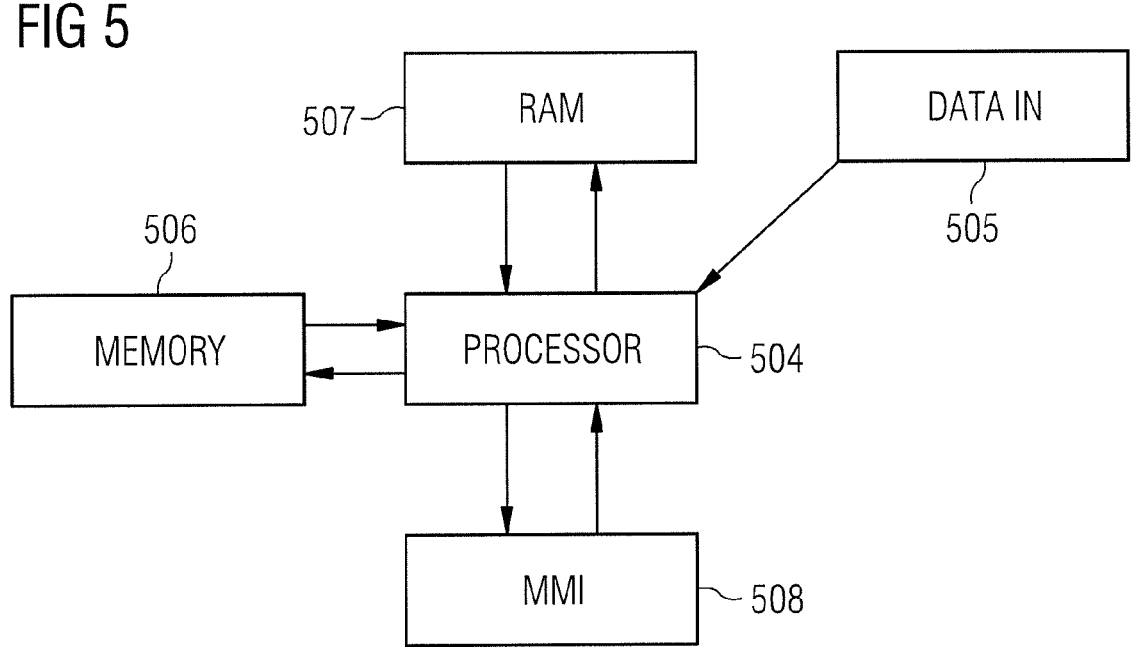
FIG. 5 is a diagram illustrating an apparatus according to an exemplary embodiment of the invention.

Referring to FIG. 5, the above embodiments may be conveniently realized as a computer system suitably programmed with instructions for carrying out the steps of the methods according to the exemplary embodiments.

For example, a central processing unit 504 is able to receive data representative of medical scans via a port 505 which could be a reader for portable data storage media (e.g. CD-ROM); a direct link with apparatus such as a medical scanner (not shown) or a connection to a network. For example, in an embodiment, the processor performs such steps as determining at least one local maximum region of the image for which a value of a given variable is a local maximum value; registering a user-selection of an initial voxel in the image; and selecting, as a region of interest, a connected set of voxels for which values of the given variable are greater than a threshold.

Software applications loaded on memory 506 are executed to process the image data in random access memory 507.

A Man—Machine interface 508 typically includes a keyboard/mouse/screen combination (which allows user input such as initiation of applications) and a screen on which the results of executing the applications are displayed.

It will be appreciated by those skilled in the art that the invention has been described by way of example only, and that a variety of alternative approaches may be adopted without departing from the scope of the invention, as defined by the appended claims.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A method of identifying a desired region of interest in a medical image of a subject where said medical image has a first maximum region having a first maximum value of a given variable inside of which said region of interest is to be identified, and a second maximum region spaced from said first maximum region and with a second maximum value of said given variable where the second maximum value is greater than the first maximum value, comprising the steps of:
   registering a user-selected initial voxel in the image which is in said first maximum region;
   also determining a first threshold which is a given fraction of said first maximum value and also defining a maximum tolerated distance between said user-selected voxel and said region of interest to be identified;
   using said first threshold, identifying values of said given variable of the image which are higher than said first threshold so as to define a first region of interest;
   checking whether said first region of interest includes both the first and the second maximum regions, and if so increasing the first threshold to a second threshold which is said given fraction of the second maximum value;
   using said second threshold, identifying values of the given variable of the image which are higher than said second threshold to define a second region of interest;
   if a distance of said second region of interest from said user-selected initial voxel is greater than said tolerated distance then determining a third threshold which is a higher fraction of said first maximum value than said given fraction; and
   using said third threshold, identifying values of the given variable of the image which are higher than said third threshold to define a third region of interest as said desired region which lies inside said first maximum region.

2. The method of claim 1 wherein following the user selection of the initial voxel in the first maximum region, a further user selection of at least another voxel occurs.

3. The method according to claim 2 wherein the further selected voxel is closer to said first maximum value than is the initial selected voxel.

4. The method of claim 2 wherein the further user selection comprises selection of a connected set of voxels in a line across the image.

5. The method according to claim 4 wherein:
   the initial voxel is selected by a single contact on a user interface device; and
   the line is selected by a continuous contact on the user interface device, and wherein a cursor crosses a display showing the image along the selection line.

6. The method according to claim 4 wherein the user-selected initial voxel is a beginning of said line and said line extends toward said first maximum value of said first maximum region.

7. The method according to claim 4 wherein the user-selected initial voxel is set as a midpoint voxel of the line.

8. The method according to claim 1 further comprising:
   pre-processing the image to generate a list of voxels of the image sorted according to the given variable; and
   following generation of the list, registering the user selection of the initial voxel.

9. The method according to claim 8 wherein the list of voxels is generated by a connected-component algorithm.

10. The method according to claim 1 wherein the given fraction is 40%.

11. The method according to claim 1 wherein the given variable is intensity.

12. The method according to claim 11 wherein the intensity is measured as SUV.

13. An apparatus for identifying a desired region of interest in a medical image of a subject where said medical image has a first maximum region having a first maximum value of a given variable inside of which said region of interest is to be identified, and a second maximum region spaced from said first maximum region and with a second maximum value of said given variable where the second maximum value is greater than the first maximum value, comprising:
   a processor configured to perform the steps of:
      registering a user-selected initial voxel in the image which is in said first maximum region,
      also determining a first threshold which is a given fraction of said first maximum value and also defining a maximum tolerated distance between said user-selected voxel and said region of interest to be identified,
      using said first threshold, identifying values of said given variable of the image which are higher than said first threshold so as to define a first region of interest,
      checking whether said first region of interest includes both the first and the second maximum regions, and if so increasing the first threshold to a second threshold which is said given fraction of the second maximum value, using said second threshold, identifying values of the given variable of the image which are higher than said second threshold to define a second region of interest, if a distance of said second region of interest from said user-selected initial voxel is greater than said tolerated distance then determining a third threshold which is a higher fraction of said first maximum value than said given fraction, and using said third threshold, identifying values of the image which are higher than said third threshold to define a third region of interest as said desired region of interest which lies inside said first maximum region; and a display device configured to display the image and the desired region of interest.

14. A non-transient computer readable medium having a program tangibly embodied thereon for identifying a desired region of interest in a medical image of a subject where said medical image has a first maximum region having a first maximum value of a given variable inside of which said region of interest is to be identified, and a second maximum region spaced from said first maximum region and with a second maximum value of said given variable where the second maximum value is greater than the first maximum value, said program performing the steps of:

registering a user-selected initial voxel in the image which is in said first maximum region;

also determining a first threshold which is a given fraction of said first maximum value and also defining a maximum tolerated distance between said user-selected voxel and said region of interest to be identified;

using said first threshold, identifying values of said given variable of the image which are higher than said first threshold so as to define a first region of interest;

checking whether said first region of interest includes both the first and the second maximum regions, and if so increasing the first threshold to a second threshold which is said given fraction of the second maximum value;

using said second threshold, identifying values of the given variable of the image which are higher than said second threshold to define a second region of interest;

if a distance of said second region of interest from said user-selected initial voxel is greater than said tolerated distance then determining a third threshold which is a higher fraction of said first maximum value than said given fraction; and using said third threshold, identifying values of the given variable of the image which are higher than said third threshold to define a third region of interest as said desired region of interest which lies inside said first maximum region.

15. A method of identifying a region of interest in a medical image of a subject, comprising:

determining at least one local maximum region of the image for which a value of a given variable is a local maximum value;

registering a user-selection of an initial voxel in the image;

selecting, as said region of interest, a connected set of voxels for which values of the given variable are greater than a threshold, the selected set of voxels comprising a first local maximum region at a distance from the user-selected voxel, and the threshold being a given fraction of the local maximum value of the first local maximum region in the set;

in the connected set of voxels each voxel of the set being adjacent to another voxel of the set, and any pair of voxels of the set being connected by a path of adjacent voxels of the region;

in a further iteration altering the given fraction by a user selection interaction;

the user selection interaction comprising, following user selection of the initial voxel, a further user selection of at least another voxel; and the further selected voxel being closer to a second local maximum region than the initial voxel, and wherein a difference in the variable between the initial and further selected voxels being used to calculate the alteration in the given fraction.

16. A method of identifying a region of interest in a medical image of a subject, comprising:

determining at least one local maximum region of the image for which a value of a given variable is a local maximum value;

registering a user-selection of an initial voxel in the image;

selecting, as said region of interest, a connected set of voxels for which values of the given variable are greater than a threshold, the selected set of voxels comprising a first local maximum region at a distance from the user-selected voxel, and the threshold being a given fraction of the local maximum value of the first local maximum region in the set;

in the connected set of voxels each voxel of the set being adjacent to another voxel of the set, and any pair of voxels of the set being connected by a path of adjacent voxels of the region;

a further iteration altering the given fraction by a user selection interface; and the user selection interaction comprising user selection of a connected set of voxels in a line across the image, and wherein the initial voxel is set as a midpoint voxel of the line, and a difference in the variable between the midpoint voxel and an end of the line having a lower value for the variable than the other end being used to calculate the alteration in the given fraction.

\* \* \* \* \*